(12) United States Patent
Guo et al.

(10) Patent No.: US 11,644,971 B2
(45) Date of Patent: May 9, 2023

(54) KEYBOARD DISPLAYING METHOD AND DEVICE AND STORAGE MEDIUM

(71) Applicant: BEIJING XIAOMI MOBILE SOFTWARE CO., LTD., Beijing (CN)

(72) Inventors: Runhua Guo, Beijing (CN); Lin Fan, Beijing (CN); Zhanwei Luo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/463,534

(22) Filed: Aug. 31, 2021

(65) Prior Publication Data

US 2022/0308750 A1 Sep. 29, 2022

(30) Foreign Application Priority Data

Mar. 25, 2021 (CN) .......................... 202110322328.5

(51) Int. Cl.
*G06F 3/0488* (2022.01)
*G06F 3/04886* (2022.01)
*H04M 1/72469* (2021.01)

(52) U.S. Cl.
CPC ..... *G06F 3/04886* (2013.01); *H04M 1/72469* (2021.01)

(58) Field of Classification Search
CPC ................ G06F 3/04886; H04M 1/72469
See application file for complete search history.

(56) References Cited

U.S. PATENT DOCUMENTS

| 9,116,616 | B2* | 8/2015 | Kyprianou | G06F 3/04886 |
| 2010/0083111 | A1* | 4/2010 | de los Reyes | G06F 3/04886 |
| | | | | 715/702 |
| 2010/0110017 | A1* | 5/2010 | Lee | G06F 3/04886 |
| | | | | 345/173 |
| 2011/0242138 | A1* | 10/2011 | Tribble | G06F 3/04886 |
| | | | | 345/173 |
| 2012/0050187 | A1* | 3/2012 | Chen | G06F 3/04886 |
| | | | | 345/173 |
| 2012/0113007 | A1 | 5/2012 | Koch et al. | |

(Continued)

FOREIGN PATENT DOCUMENTS

WO WO-2014088343 A1 * 6/2014 ............. G06F 3/041

OTHER PUBLICATIONS

Extended European Search Report of EP Application No. 21199307.6 dated Mar. 30, 2022, (9p).

*Primary Examiner* — Carolyn R Edwards
(74) *Attorney, Agent, or Firm* — Arch & Lake LLP

(57) ABSTRACT

A method and a device for displaying a keyboard, and a storage medium thereof are provided. The method is applied to a terminal and includes that the terminal generates, in response to receiving a trigger for displaying separate keyboards, at least two separate keyboards with display areas separated from each other on a screen of the terminal, where the at least two separate keyboards are generated respectively based on corresponding keyboard panels. Furthermore, the method includes that the terminal displays keyboard keys on each of the at least two separate keyboards, where the keyboard keys displayed on all the at least two separate keyboards constitute keyboard keys displayed on an unseparated keyboard.

12 Claims, 9 Drawing Sheets

(56) References Cited

U.S. PATENT DOCUMENTS

| | | | |
|---|---|---|---|
| 2012/0117506 A1* | 5/2012 | Koch | G06F 3/04886 345/173 |
| 2012/0120016 A1* | 5/2012 | Mittal | G06F 3/04886 345/173 |
| 2012/0206363 A1 | 8/2012 | Kyprianou et al. | |
| 2012/0206370 A1* | 8/2012 | Ivanovic | G06F 3/04886 345/173 |
| 2013/0057475 A1* | 3/2013 | Duggan | G06F 3/0216 345/168 |
| 2015/0317026 A1* | 11/2015 | Choi | G06F 3/0481 345/660 |
| 2018/0136835 A1* | 5/2018 | Heo | G06F 3/04886 |
| 2020/0160380 A1* | 5/2020 | Moore | G06Q 30/0267 |
| 2020/0409512 A1* | 12/2020 | Jing | G06F 3/04845 |

\* cited by examiner

KEYBOARD DISPLAYING METHOD AND DEVICE AND STORAGE MEDIUM

CROSS-REFERENCE TO RELATED APPLICATIONS

This application is based upon and claims priority to Chinese Patent Application No. 202110322328.5, filed on Mar. 25, 2021, the entire contents thereof are incorporated herein by reference for all purposes.

TECHNICAL FIELD

The present disclosure relates to the field of terminal technology, and in particular to a keyboard displaying method, a keyboard displaying device and a storage medium.

BACKGROUND

With the rapid development of science and technology, terminal technology has made great progress. Terminal products have varied forms, rich functions, and higher and higher configurations to meet people's various needs in work and life. The terminal product usually realizes operation control through a display screen. The screen may be set to be larger, which is convenient for operation and can protect eyesight.

At present, a keyboard displayed on the terminal screen has a fixed display position. When the terminal screen is large, the size of the keyboard increases in proportion to the size of the screen. When a user holds the terminal with both hands and clicks on the keyboard to input, keyboard keys displayed in the middle of the screen are difficult to be operated. Optionally, a floating keyboard may be set, in which a keyboard panel may be zoomed out to be floated on the terminal screen. However, the floating keyboard is based on the use scenario of clicking and typing on the screen with one hand, so that the input is slow, which brings inconvenience to the user's operation.

SUMMARY

The present disclosure provides a keyboard displaying method, a keyboard displaying device and a storage medium.

According to a first aspect of the present disclosure, a method for displaying a keyboard is provided. The method includes that a terminal generates, in response to receiving a trigger for displaying separate keyboards, at least two separate keyboards with display areas separated from each other on a screen of the terminal, where the at least two separate keyboards are generated respectively based on corresponding keyboard panels. Furthermore, the terminal displays keyboard keys on each of the at least two separate keyboards, where the keyboard keys displayed on all the at least two separate keyboards constitute keyboard keys displayed on an unseparated keyboard.

According to a second aspect of the present disclosure, a device for displaying a keyboard is provided. The device may include a processor and a memory having instructions stored thereon that are executable by the processor. The processor is configured to generate, in response to receiving a trigger for displaying separate keyboards, at least two separate keyboards with display areas separated from each other on a screen of a terminal, where the at least two separate keyboards are generated respectively based on corresponding keyboard panels.

Furthermore, the process is configured to perform acts including displaying keyboard keys on each of the at least two separate keyboards, where the keyboard keys displayed on all the at least two separate keyboards constitute keyboard keys displayed on an unseparated keyboard.

According to a third aspect of the present disclosure provides a non-transitory computer-readable storage medium, having instructions stored thereon that, when being executed by a processor of a terminal, cause the terminal to perform acts including generating, in response to receiving a trigger for displaying separate keyboards, at least two separate keyboards with display areas separated from each other on a screen of the terminal, where the at least two separate keyboards are generated respectively based on corresponding keyboard panels.

Furthermore, the terminal is caused to perform acts including displaying keyboard keys on each of the at least two separate keyboards, where the keyboard keys displayed on all the at least two separate keyboards constitute keyboard keys displayed on an unseparated keyboard.

It should be understood that the above general description and the following detailed description are only exemplary and explanatory, which do not intend to limit the present disclosure.

BRIEF DESCRIPTION OF THE DRAWINGS

The drawings here are incorporated into the specification and constitute a part of the specification, show embodiments that conform to the present disclosure, and are used together with the specification to explain the principle of the present disclosure.

DETAILED DESCRIPTION

Figure 1:
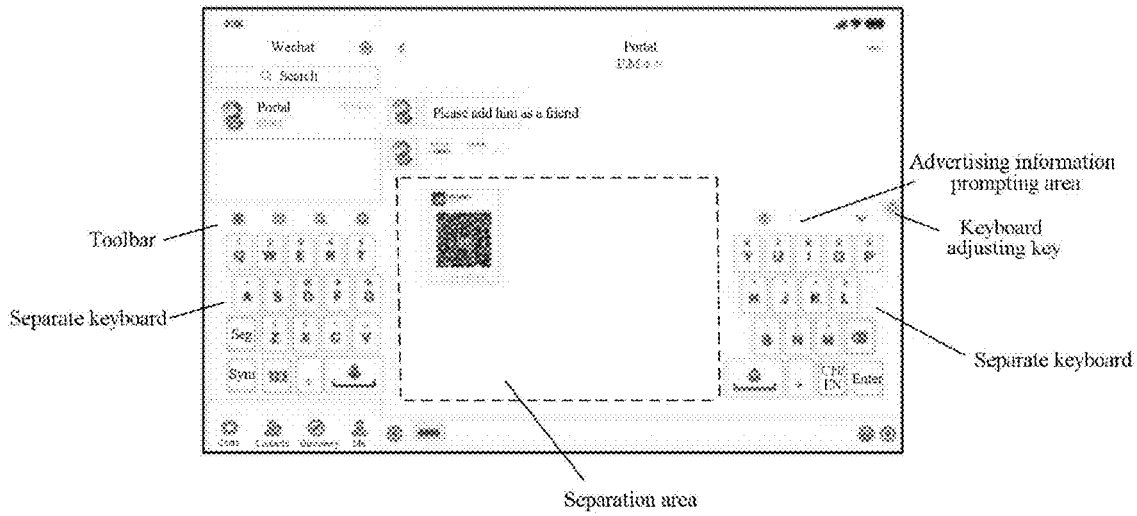
FIG. 1 is a schematic diagram showing an application of a keyboard displaying method according to an example of the present disclosure.

Exemplary embodiments will be described in detail here, and examples thereof are shown in the accompanying drawings. When the following description is made by referring to the drawings, unless otherwise indicated, the same numbers in different drawings indicate the same or similar elements. The implementations described in the following examples do not represent all implementations in the present disclosure. Rather, they are merely examples of devices and methods in some aspects of the present disclosure as detailed in the appended claims.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

With the development of Internet technology, terminal devices are becoming more and more diverse. When terminal devices with large-screen such as folding screens and tablets are used, input is performed through a virtual keyboard displayed on the screen. The keyboard displayed on the terminal screen has a fixed display position. When the terminal screen is large, the size of the keyboard increases in proportion to the size of the screen, which brings inconvenience to the user for keyboard input. When a manner in which the keyboard is zoomed out and floated on the screen is used, the user can only use one hand to click and operate the zoomed out screen for typing, which has a low input efficiency and cannot achieve input requirements of the user that can achieved when the user holds the device with both hands. In another manner, the keyboard is displayed as two parts which share a same keyboard panel, and the keys are divided into two parts displayed on both sides of the screen with a middle area set to be blank. At this time, although the keys on both sides are easy for the user to operate on both sides of the screen, because the keys on both sides share the same keyboard panel and most of the blank area in the middle is also part of the keyboard panel, the screen will be blocked. Further, the blank area does not support interaction and thus affects the operation of the user.

Therefore, the present disclosure provides a keyboard displaying method, which generates at least two separate keyboards separated from each other respectively based on corresponding keyboard panels, and displays the at least two separate keyboards on a terminal screen independently of each other, so as to realize true separated display of the keyboards.

FIG. 1 is a schematic diagram showing an application of a keyboard displaying method according to an example of the present disclosure. As shown in FIG. 1, when a user uses a terminal, it is determined to display separate keyboards, and two separate keyboards which are separated from each other are displayed on a screen of the terminal.

Figure 2:
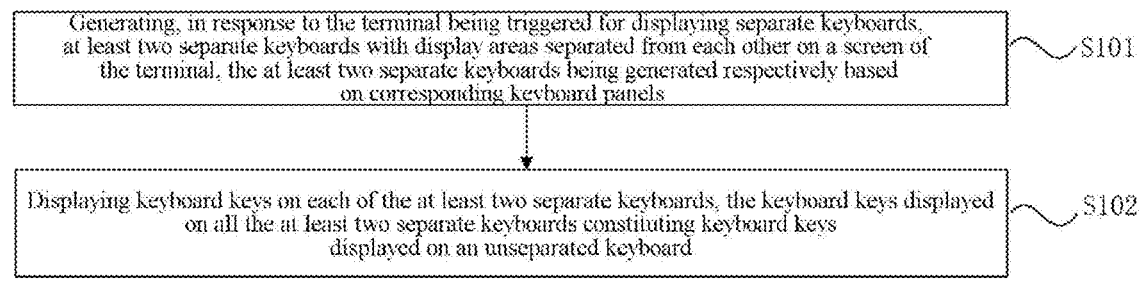
FIG. 2 is a flowchart showing a keyboard displaying method according to an example of the present disclosure.

FIG. 2 is a flowchart showing a keyboard displaying method according to an example of the present disclosure. The keyboard displaying method is applied to a terminal. As shown in FIG. 2, the keyboard displaying method includes:

step S101, generating, in response to the terminal being triggered for displaying separate keyboards, at least two separate keyboards with display areas separated from each other on a screen of the terminal, the at least two separate keyboards being generated respectively based on corresponding keyboard panels; and step S102, displaying keyboard keys on each of the at least two separate keyboards, the keyboard keys displayed on all the at least two separate keyboards constituting keyboard keys displayed on an unseparated keyboard.

In an embodiment of the present disclosure, the separate keyboard is a virtual keyboard displayed on the display screen of the terminal, and the input of characters and the like may be realized by clicking a key of the separate keyboard on the display screen. The separate keyboards are distinguished from an unseparated keyboard and are the at least two keyboards with the display areas separated from each other displayed on the screen of the terminal, and each of the separate keyboards is generated based on a respective keyboard panel corresponding thereto. The at least two separate keyboards are respectively displayed in the form of keyboard panels on corresponding areas of the display screen. The keyboard panels respectively corresponding to the separate keyboards are independent of each other and separated from each other. The user may operate and control the separate keyboards respectively. It may be understood that the keyboard panel includes keyboard keys and layout of the keyboard keys. The distributions of the keyboard keys in different separate keyboards may be different, the same or partly the same. The keyboard keys displayed on all the separate keyboards after being separated constitute all the keyboard keys displayed on the non-separated keyboard, so that the separate keyboards after being separated may realize all the functions corresponding to the non-separated keyboard. Triggering the terminal to display the separate keyboards may be triggered by the user in a setting menu, or triggered by touch input, voice input, gesture input and the like.

According to an embodiment of the present disclosure, when the terminal is triggered for displaying the separate keyboards, at least two separate keyboards with display areas separated from each other are generated on the screen of the terminal, the respective separate keyboards of the at least two separate keyboards are generated respectively based on respective corresponding keyboard panels and are independent of each other, keyboard keys are displayed on each of the separate keyboards, and the keyboard keys displayed on all the separate keyboards constitute keyboard keys displayed on the unseparated keyboard, so that the separate keyboards after being separated may realize all the functions corresponding to the non-separated keyboard, thereby realizing the separate display of the keyboard and improving input experience of the user through the keyboard.

Figure 3:
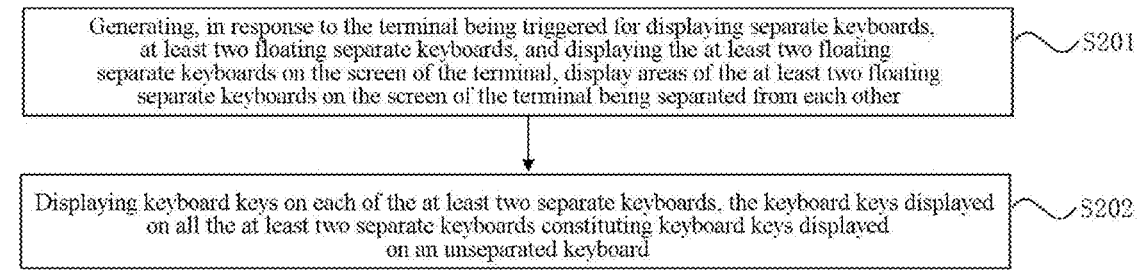
FIG. 3 is a flowchart showing a keyboard displaying method according to an example of the present disclosure.

FIG. 3 is a flowchart showing a keyboard displaying method according to an example of the present disclosure. The keyboard display method is applied to a terminal. As shown in FIG. 3, the keyboard displaying method includes:

step S201, generating, in response to the terminal being triggered for displaying separate keyboards, at least two floating separate keyboards, and displaying the at least two floating separate keyboards on the screen of the terminal, display areas of the at least two floating separate keyboards on the screen of the terminal being separated from each other; and step S202, displaying keyboard keys on each of the at least two separate keyboards, the keyboard keys displayed on all the at least two separate keyboards constituting keyboard keys displayed on an unseparated keyboard.

In an embodiment of the present disclosure, the respective separate keyboards of the at least two separate keyboards are generated respectively based on respective corresponding keyboard panels, and each of the separate keyboards has a corresponding keyboard panel. The terminal is triggered for displaying the separate keyboards, and at least two floating separate keyboards are generated. The generated floating separate keyboards are displayed on the screen of the terminal so that they are displayed and floated on a top layer displayed by the screen of the terminal, which is distinguished from the fixed display. The display areas of the at least two floating separate keyboards on the screen of the terminal are separated from each other, independent of each other and not continuous.

The keyboard keys displayed on all the separate keyboards after being separated constitute all the keyboard keys displayed on the non-separated keyboard, so that the separate keyboards after being separated may realize all the functions corresponding to the non-separated keyboard.

According to an embodiment of the present disclosure, when the terminal is triggered for displaying the separate keyboards, at least two floating separate keyboards with display areas separated from each other are generated on the screen of the terminal. The display areas on the screen of the terminal are separated from each other, so that the separate keyboards after being separated may realize all the functions corresponding to the unseparated keyboard, thereby realizing flexible display of the separate keyboards, and improving input operation experience of the user.

Figure 4:
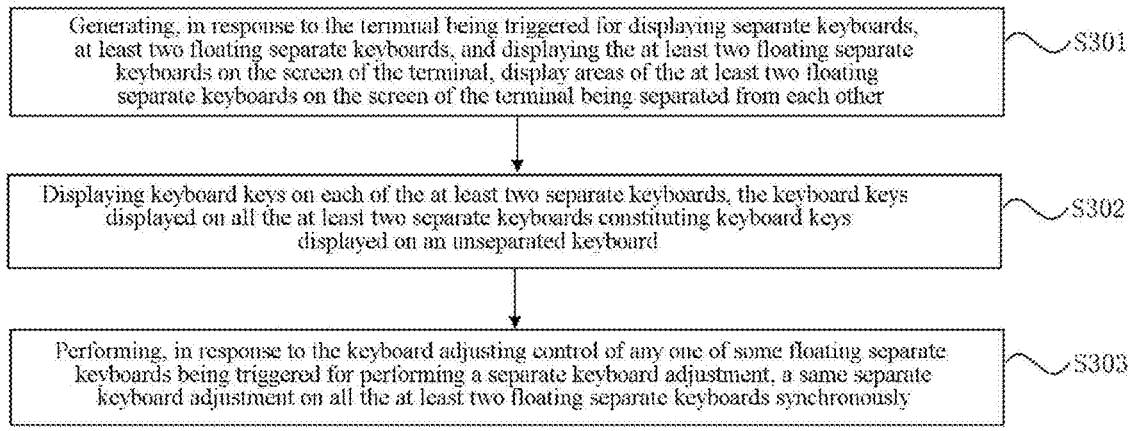
FIG. 4 is a flowchart showing a keyboard displaying method according to an example of the present disclosure.

FIG. 4 is a flowchart showing a keyboard displaying method according to an example of the present disclosure. The keyboard displaying method is applied to a terminal. As shown in FIG. 4, the keyboard displaying method includes:

step S301, generating, in response to the terminal being triggered for displaying separate keyboards, at least two floating separate keyboards, and displaying the at least two floating separate keyboards on the screen of the terminal, display areas of the at least two floating separate keyboards on the screen of the terminal being separated from each other;

step S302, displaying keyboard keys on each of the at least two separate keyboards, the keyboard keys displayed on all the at least two separate keyboards constituting keyboard keys displayed on an unseparated keyboard; and step S303, performing, in response to the keyboard adjusting control of any one of some floating separate keyboards being triggered for performing a separate keyboard adjustment, a same separate keyboard adjustment on all the at least two floating separate keyboards synchronously.

In an embodiment of the present disclosure, the respective separate keyboards of the at least two separate keyboards are generated respectively based on respective corresponding keyboard panel. The terminal is triggered for displaying the separate keyboards, and at least two floating separate keyboards are generated. The generated floating separate keyboards are displayed on the screen of the terminal so that they are displayed and floated on the top layer displayed by the screen of the terminal. The display areas of the at least two floating separate keyboards on the screen of the terminal are separated from each other, independent of each other and not continuous. The keyboard keys displayed on all the separate keyboards constitute the keyboard keys displayed on the non-separated keyboard, thereby correspondingly realizing all the functions of the non-separated keyboard. Referring to FIG. 1, the floating separate keyboards may include a keyboard adjusting control. The keyboard adjusting control receives a control operation to adjust size and position of the floating separate keyboard. For example, the keyboard adjusting control may be a window dragging control, a dragging lever and the like.

In an embodiment of the present disclosure, the keyboard adjusting control may be displayed on one floating separate keyboard, or may be displayed on a plurality of floating separate keyboards. Further, one or more keyboard adjusting controls may be displayed on the floating separate keyboard. The keyboard adjusting control of any one of the floating separate keyboards is triggered for performing separate keyboard adjustment, and all the at least two floating separate keyboards perform the same separate keyboard adjustment synchronously. For example, the terminal is triggered for displaying two floating separate keyboards, which are respectively arranged on the left and right sides of the display screen, and the two floating separate keyboards are set at the same height with respect to the display screen. All the floating separate keyboards are provided with the keyboard adjusting control. When the floating separate keyboard arranged on the left side of the display screen of the terminal is dragged upward for changing a displaying position through the keyboard adjusting control of the floating separate keyboard arranged on the left side of the display screen, the floating separate keyboard on the right side of the display screen of the terminal will then synchronously have a same position change. When the floating separate keyboard arranged on the right side of the display screen of the terminal is zoomed out or in for changing a display size thereof through the keyboard adjusting control of the floating separate keyboard arranged on the right side of the display screen, the floating separate keyboard on the left side of the display screen of the terminal will then synchronously have a same size change.

According to an embodiment of the present disclosure, when the terminal is triggered for display the separate keyboards, at least two floating separate keyboards with display areas separated from each other are generated on the screen of the terminal. The display areas on the screen of the terminal are separated from each other, so that the separate keyboards after being separated can realize all the functions corresponding to the un-separated keyboard. The keyboard adjusting control of any one of the floating separate keyboards is triggered for performing separate keyboard adjustment, and all the separate keyboards perform the same separate keyboard adjustment synchronously, so that the display of all the separated keyboards is consistent, which is convenient for keyboard adjustment operation, and can realize flexible display of the separate keyboards.

Figure 5:
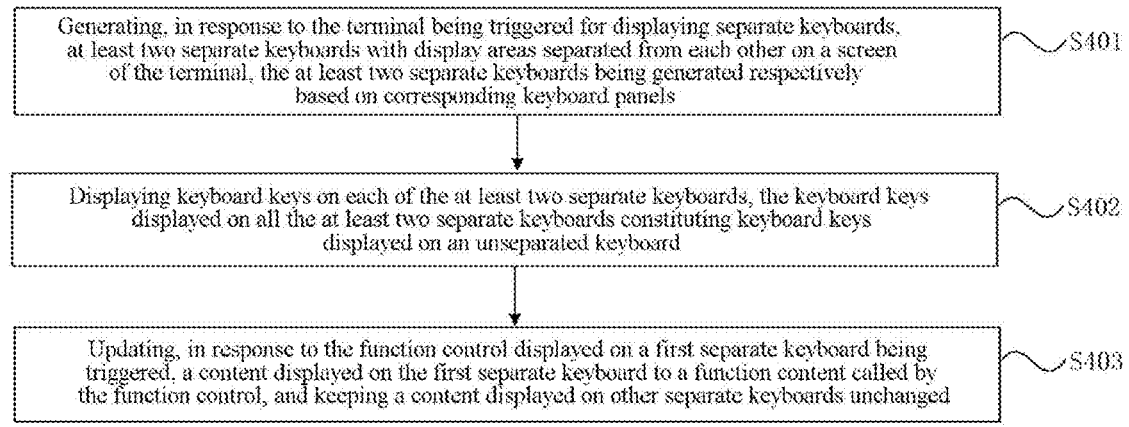
FIG. 5 is a flowchart showing a keyboard displaying method according to an example of the present disclosure.

FIG. 5 is a flowchart showing a keyboard displaying method according to an example of the present disclosure. The keyboard displaying method is applied to a terminal. As shown in FIG. 5, the keyboard displaying method includes:

step S401, generating, in response to the terminal being triggered for displaying separate keyboards, at least two separate keyboards with display areas separated from each other on a screen of the terminal, the at least two separate keyboards being generated respectively based on corresponding keyboard panels;

step S402, displaying keyboard keys on each of the at least two separate keyboards, the keyboard keys displayed on all the at least two separate keyboards constituting keyboard keys displayed on an unseparated keyboard; and step S403, updating, in response to the function control displayed on a first separate keyboard being triggered, a content displayed on the first separate keyboard to a function content called by the function control, and keeping a content displayed on other separate keyboards unchanged.

In an embodiment of the present disclosure, all the at least two separate keyboards are generated respectively based on respective corresponding keyboard panels. The terminal is triggered for displaying separate keyboards, and at least two floating separate keyboards are generated. The generated floating separate keyboards are displayed on the screen of the terminal so that they are displayed and floated on the top layer displayed by the screen of the terminal. The display areas of the floating separate keyboards are separated from each other on the screen of the terminal, and the keyboard keys displayed on all the separate keyboards constitute the keyboard keys displayed in an unseparated keyboard, thereby correspondingly realizing all the functions of the unseparated keyboard. Referring to FIG. 1, the function control may be a tool icon key, a button and the like arranged on a toolbar or arranged independently, or may be a function key in the keyboard keys, the function controls correspond to different functions, for example, switching function between Number/Chinese/English, and the toolbox control correspondingly displays a plurality of shortcut functions, settings and the like, or is a selection switching function for switching to emoji input.

In an embodiment of the present disclosure, the function control may be displayed on one floating separate keyboard, or may be displayed on a plurality of floating separate keyboards. Further, one or more function controls may be displayed on the floating separate keyboard. When the function control displayed on the first separate keyboard is triggered, only the content displayed on the first separate keyboard is updated, that is, the function content called by the function control is correspondingly displayed, and the content displayed on the other separate keyboards remains unchanged. The first separate keyboard is a separate keyboard displaying the function control being triggered, and the other separate keyboards are separate keyboards other than the first separate keyboard.

FIGS. 6A-6G are schematic diagrams showing applications of a keyboard displaying method according to an example of the present disclosure.

Figure 6A:
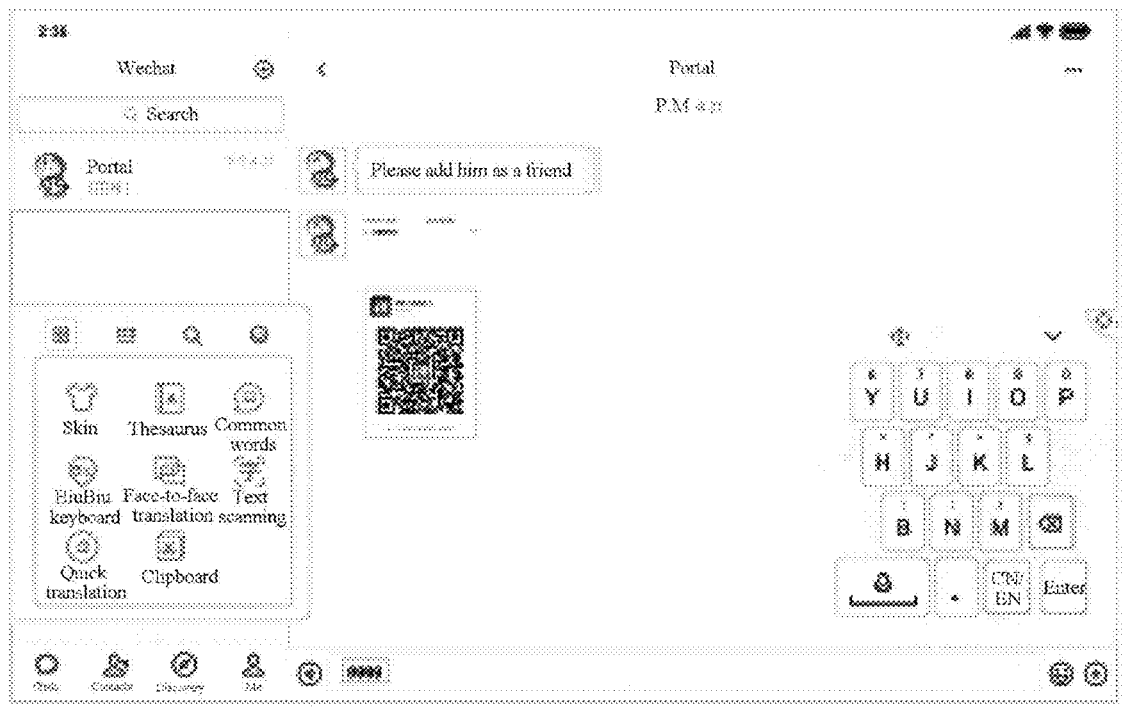
FIGS. 6A-6G are schematic diagrams showing applications of a keyboard displaying method according to an example of the present disclosure.
Figure 6B:
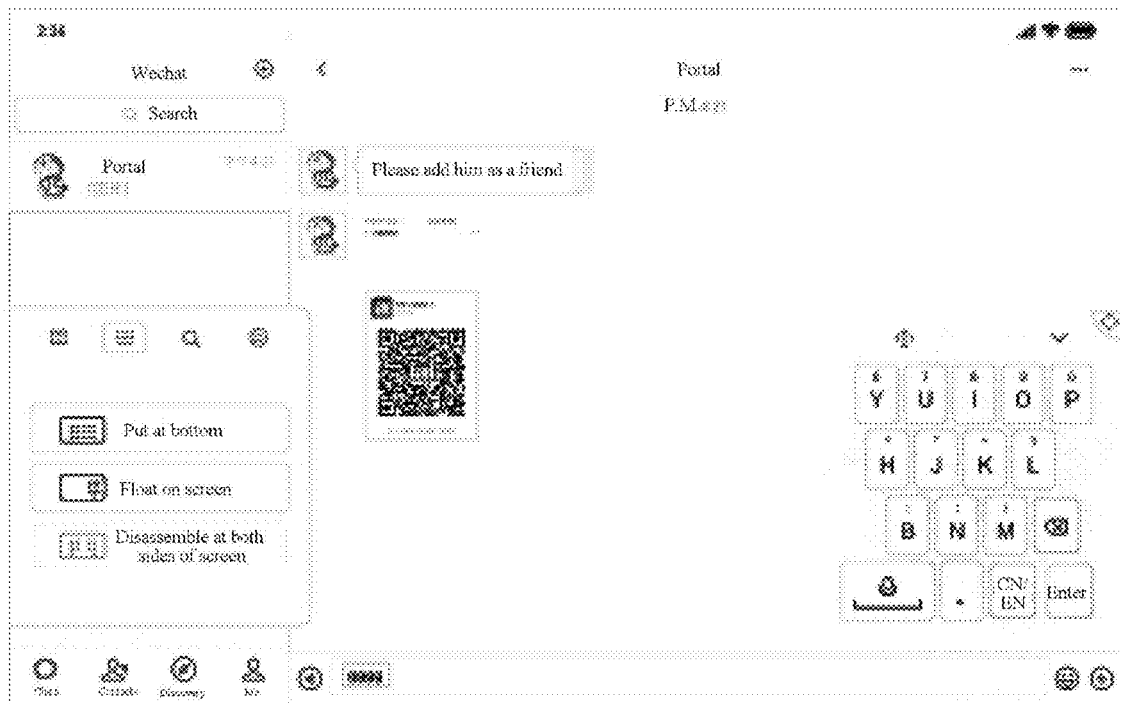
Figure 6C:
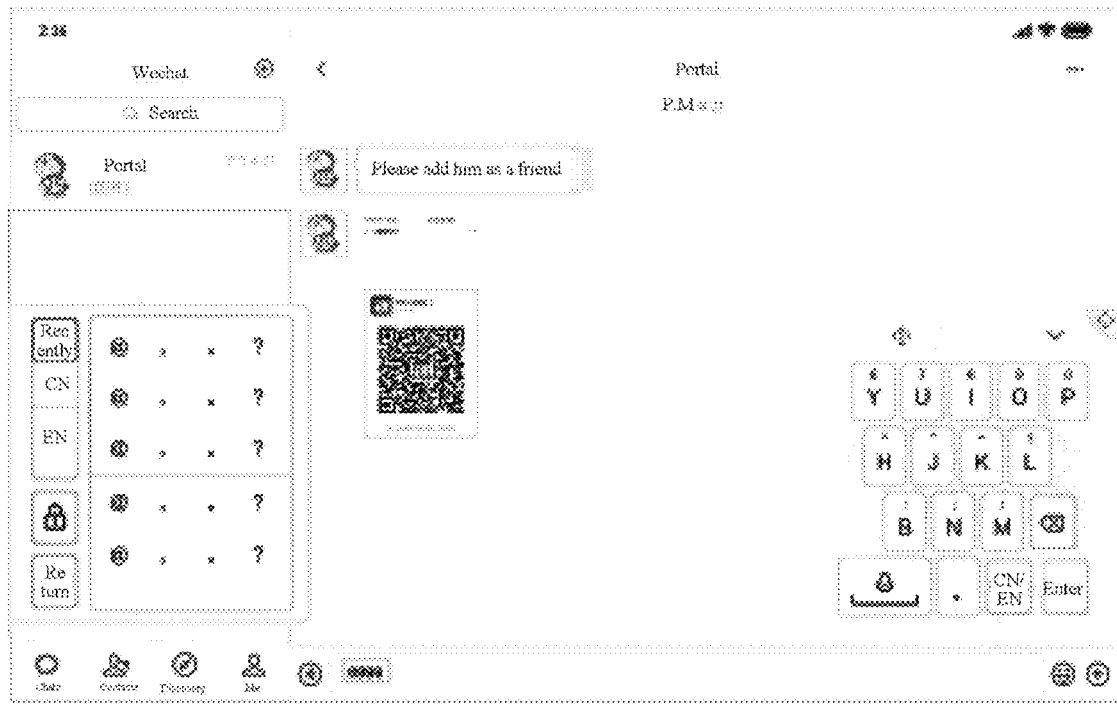
Figure 6D:
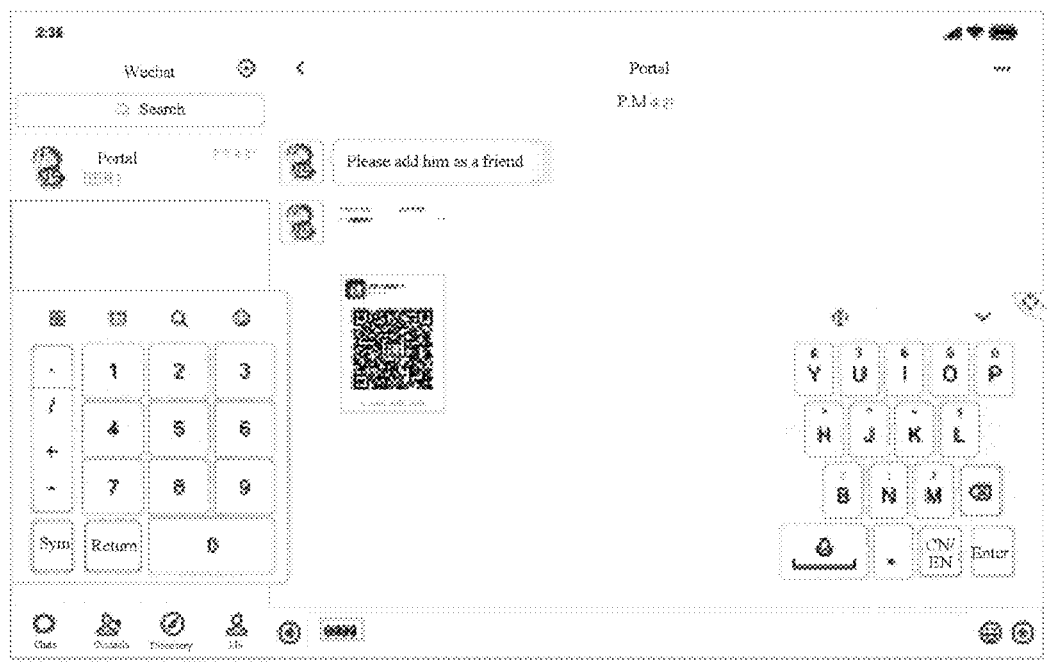
Figure 6E:
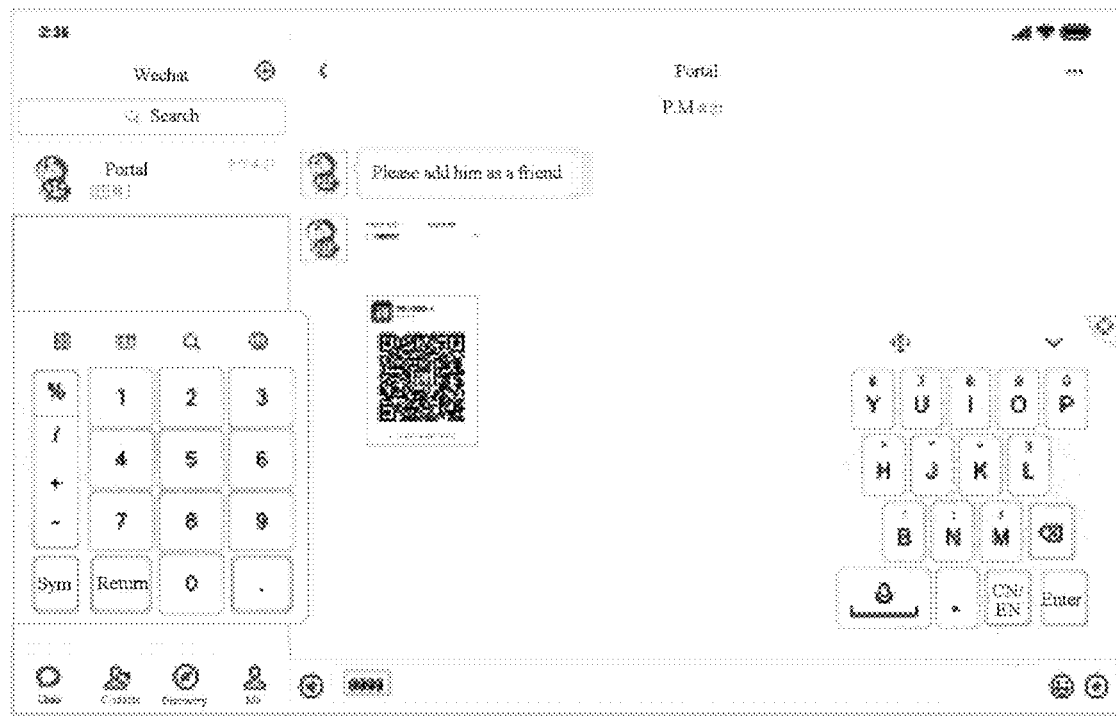
Figure 6F:
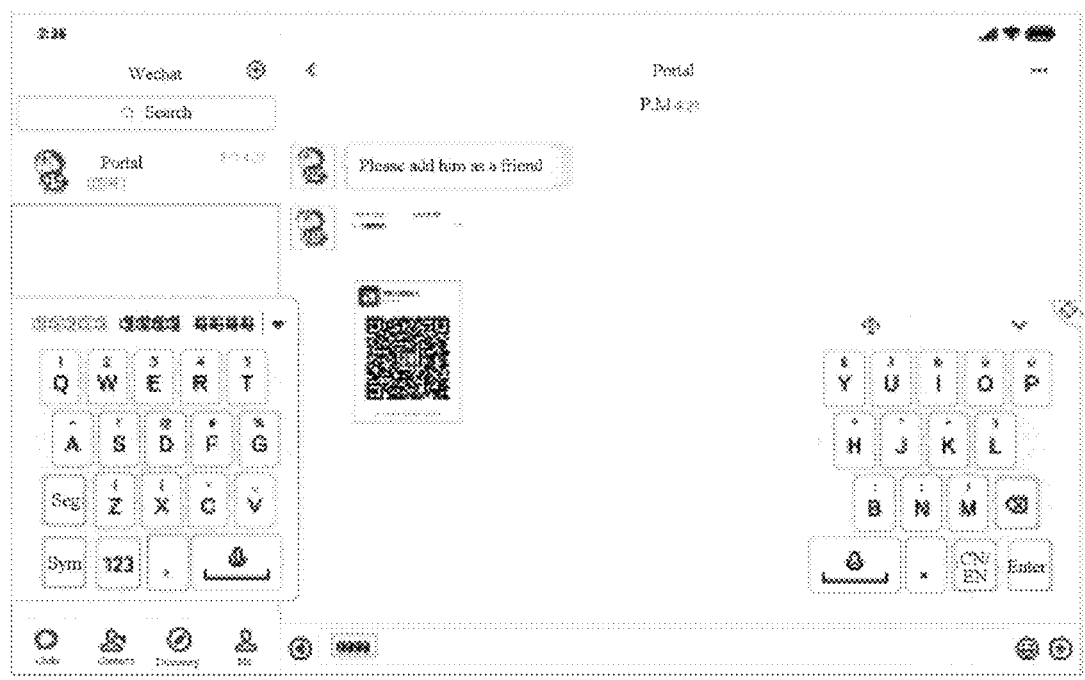
Figure 6G:
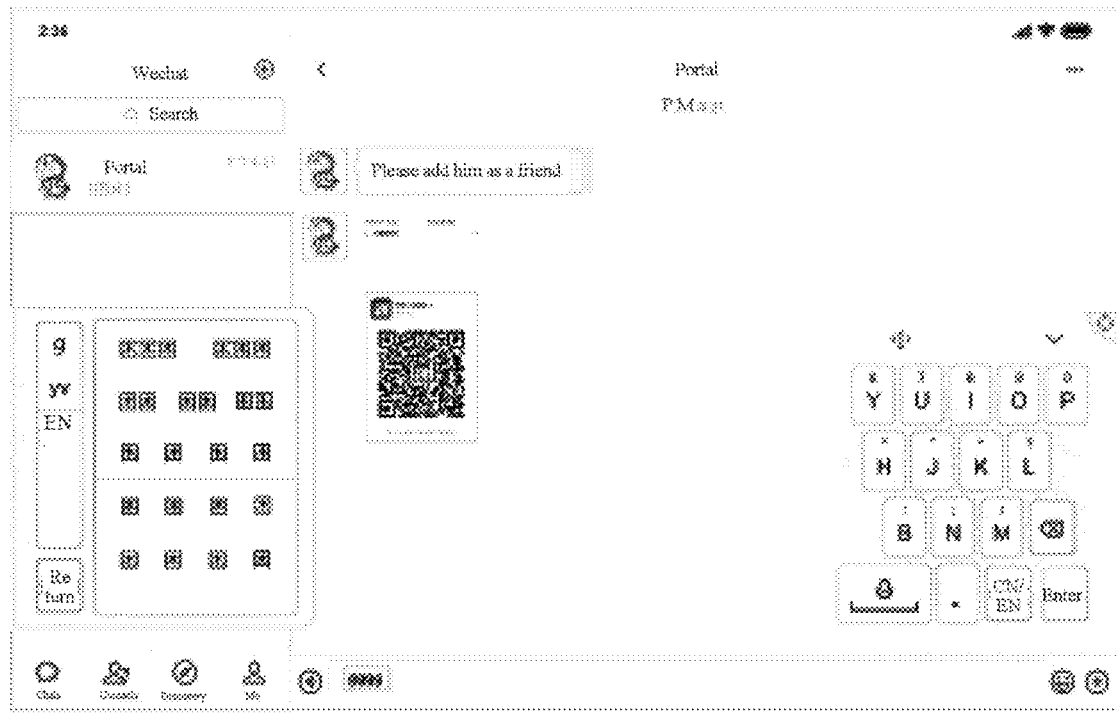

Referring to FIG. 6A, the function control is a toolbox key arranged on the toolbar of the floating separate keyboard on the left side of the display screen. When the toolbox key is triggered, the display content corresponding to the toolbox will be displayed in the floating separate keyboard on the left side. That is, shortcut icons for skin settings, thesaurus adjustment, text scanning, content translation and other functions will be displayed on the floating separate keyboard on the left, so that the user may select the shortcut icons to realize corresponding functions, and the content displayed on the floating separate keyboard on the right side remains unchanged. FIG. 6B shows that when the keyboard selecting key arranged in the toolbar of the floating separate keyboard on the left side of the display screen is triggered, the floating separate keyboard on the left side displays corresponding display content of the keyboard setting, and the content displayed on the floating separate keyboard on the right side remains unchanged. FIG. 6C shows that the function control is a symbol key arranged on the floating separate keyboard on the left side of the display screen. When the symbol key is clicked and triggered, the floating separate keyboard on the left side will display the corresponding display content of the keyboard setting, and the content displayed on the floating separate keyboard on the right side remains unchanged. FIGS. 6D and 6E show that when the number input key of the floating separate keyboard arranged on the left side of the display screen is clicked, corresponding number input keyboard layout is displayed on the floating separate keyboard on the left side. Corresponding to different application scenarios, the number input keyboard layouts are different. When entering a phone number, there is no need for decimal point input, and the number keyboard layout shown in FIG. 6D is displayed. In other scenarios such as text input, memos, calculations and the like, the number keyboard layout shown in FIG. 6D is displayed, and the display content of the floating separate keyboard on the right side remains unchanged. FIGS. 6F and 6G show that when a candidate word key arranged on the floating separate keyboard on the left side of the display screen is selected, the corresponding candidate word selection content is displayed on the floating separate keyboard on the left side, and the display content of the floating separate keyboard on the right side remains unchanged.

According to an embodiment of the present disclosure, when the terminal is triggered for displaying the separate keyboards, at least two floating separate keyboards with display areas separated from each other are generated on screen of the terminal. The display areas on the screen of the terminal are separated from each other, so that the separate keyboards can realize all the functions corresponding to an unseparated keyboard. When the function control included in the separate keyboard is clicked and triggered, the separate keyboard will display the function content called by the function control, and the display content of other separate keyboards is not changed, which reduces switching frequency, and is convenient for input operation of the user.

Figure 7:
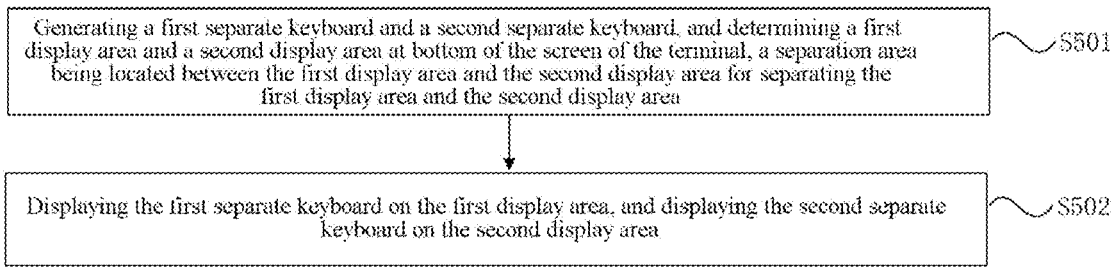
FIG. 7 is a flowchart showing a method for generating separate keyboards according to an example of the present disclosure.

FIG. 7 is a flowchart showing a method for generating separate keyboards according to an example of the present disclosure. The keyboard displaying method is applied to a terminal. As shown in FIG. 7, the method for generating separate keyboards includes:

step S501, generating a first separate keyboard and a second separate keyboard, and determining a first display area and a second display area at bottom of the screen of the terminal, a separation area being located between the first display area and the second display area for separating the first display area and the second display area; and step S502, displaying the first separate keyboard on the first display area, and displaying the second separate keyboard on the second display area.

Referring to FIG. 1, in an embodiment of the present disclosure, when the terminal is triggered for displaying separate keyboards, two separate keyboards, i.e., a first separate keyboard and a second separate keyboard, are generated respectively based on respective corresponding keyboard panels. The first separate keyboard and the second separate keyboard are respectively displayed on the first display area and the second display area at the bottom of the screen of the terminal. The first display area and the second display area are not continuous, are separated from each other, and are arranged independently. There is a separation/interval area between the two display areas, and the separation area separates the first display area and the second display area. It may be understood that the separation area between the first display area and the second display area is used to perform display on the terminal screen. Normal operation such as click operation and touch operation may be performed on the separation area like the other areas of the screen of the terminal than the first and second areas, which may reduce the impact on the use of the display area of the screen.

According to an embodiment of the present disclosure, when the terminal is triggered for displaying the separate keyboards, the first separate keyboard and the second separate keyboard with display areas separated from each other are generated on the screen of the terminal. The first separate keyboard and the second separate keyboard are displayed at the bottom of the screen of the terminal, and the display areas thereof are separated from each other. The separation area in the middle may be clicked normally without being affected by display of the separate keyboards, thereby reducing the blocking of the keyboard on the terminal screen display, reducing the screen area occupied by the keyboard display, optimizing keyboard input, and improving user experience.

Figure 8:
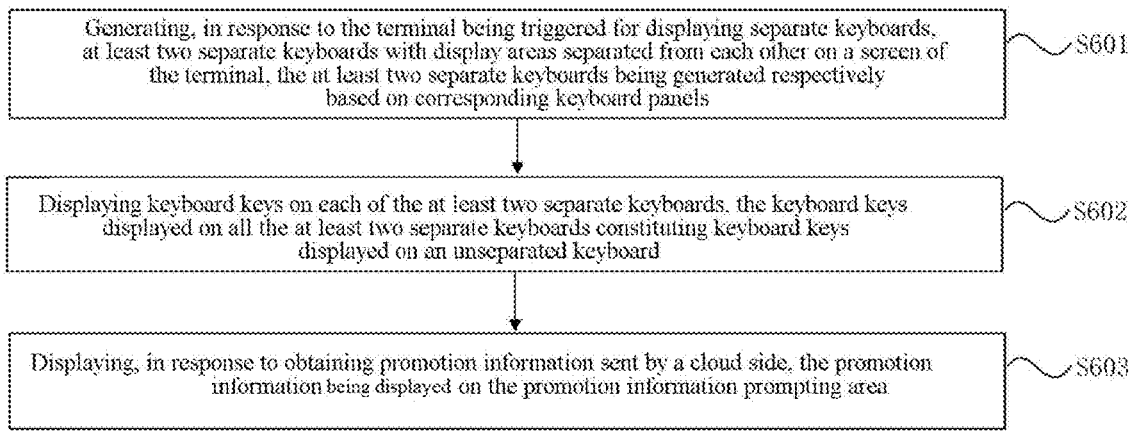
FIG. 8 is a flowchart showing a keyboard displaying method according to an example of the present disclosure.

FIG. 8 is a flowchart showing a keyboard displaying method according to an example of the present disclosure. The keyboard displaying method is applied to a terminal. As shown in FIG. 8, the keyboard displaying method includes:

step S601, generating, in response to the terminal being triggered for displaying separate keyboards, at least two separate keyboards with display areas separated from each other on a screen of the terminal, the at least two separate keyboards being generated respectively based on corresponding keyboard panels;

step S602, displaying keyboard keys on each of the at least two separate keyboards, the keyboard keys displayed on all the at least two separate keyboards constituting keyboard keys displayed on an unseparated keyboard; and step S603, displaying, in response to obtaining promotion information sent by a cloud side, the promotion information being displayed on the promotion information prompting area.

In an embodiment of the present disclosure, the promotion information prompting area is displayed on some separate keyboards of the at least two separate keyboards.

In an embodiment of the present disclosure, when the terminal is triggered for displaying the separate keyboards, at least two keyboards separated from each other are displayed on the screen of the terminal, and the separate keyboards are generated respectively based on respective corresponding keyboard panels. The keyboard panels respectively corresponding to the separate keyboards are independent of each other and separated from each other. The keyboard keys displayed on all the separate keyboards after being separated constitute all the keyboard keys displayed in the non-separated keyboard, so that the separate keyboards after being separated can realize all the functions corresponding to the non-separated keyboard. Referring to FIG. 1, the floating separate keyboard may include a promotion information prompting area. The promotion information prompting area is used to prompt the promotion information, which may be system-related, application software-related, or commercial promotion-related information.

In an embodiment of the present disclosure, the promotion information prompting area may be displayed on one floating separate keyboard, or may be displayed on a plurality of floating separate keyboards. When the promotion information sent from the cloud side is obtained, message prompts such as promotion advertisements, software or system update prompts, news pushes may be displayed on the promotion information prompting area based on the received promotion information.

According to an embodiment of the present disclosure, when the terminal is triggered for displaying the separate keyboards, at least two separate keyboards separated from each other are generated respectively based on respective keyboard panels and displayed on the terminal screen independently of each other. The promotion information prompting area of the keyboard may be used to display the promotion prompting information sent by the cloud side, which effectively prompts the user and enriches the use function of the separate keyboard.

Based on the same concept, an embodiment of the present disclosure also provides a keyboard displaying device.

It can be understood that, in order to implement the above-mentioned functions, the device provided in the embodiment of the present disclosure includes corresponding hardware structures and/or software modules for performing functions. In combination with the units and algorithm steps of the examples disclosed in the embodiment of the present disclosure, the embodiment of the present disclosure may be implemented in the form of hardware or a combination of hardware and computer software. Whether a certain function is executed by hardware or computer software-driven hardware depends on the specific application and design constraint conditions of the technical solution. Those skilled in the art may use different methods for each specific application to implement the described functions, but such implementation should not be considered as going beyond the scope of the technical solutions of the embodiments of the present disclosure.

Figure 9:
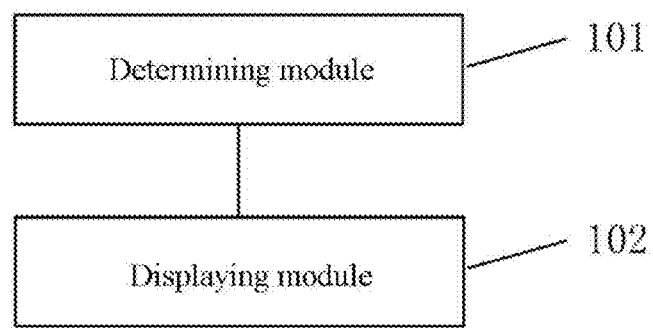
FIG. 9 is a block diagram showing a keyboard displaying device according to an example of the present disclosure.

FIG. 9 is a block diagram showing a keyboard displaying device according to an example of the present disclosure. Referring to FIG. 9, the keyboard displaying device is applied to a terminal, and the keyboard displaying device 100 includes a determining module 101 and a displaying module 102.

The determining module 101 is configured to generate, in response to the terminal being triggered for displaying separate keyboards, at least two separate keyboards with display areas separated from each other on a screen of the terminal, the at least two separate keyboards being generated respectively based on corresponding keyboard panels.

The displaying module 102 is configured to display keyboard keys on each of the at least two separate keyboards, the keyboard keys displayed on all the at least two separate keyboards constituting keyboard keys displayed on an unseparated keyboard.

In an embodiment, the determining module 101 generates the at least two separate keyboards with the display areas separated from each other on the screen of the terminal in a way of:

generating at least two floating separate keyboards, and displaying the at least two floating separate keyboards on the screen of the terminal, display areas of the at least two floating separate keyboards on the screen of the terminal being separated from each other.

Figure 10:
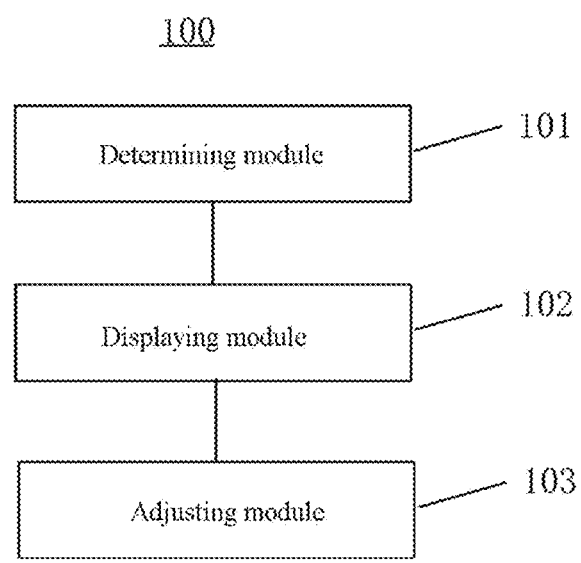
FIG. 10 is a block diagram showing a keyboard displaying device according to an example of the present disclosure.

In an embodiment, a keyboard adjusting control is displayed on some floating separate keyboards of the at least two floating separate keyboard. FIG. 10 is a block diagram of a keyboard displaying device according to an example of the present disclosure. Referring to FIG. 10, the keyboard displaying device 100 further includes an adjusting module 103.

The adjusting module 103 is configured to perform, in response to the keyboard adjusting control of any one of said some floating separate keyboards being triggered for performing a separate keyboard adjustment, a same separate keyboard adjustment on all the at least two floating separate keyboards synchronously.

In an embodiment, one or more function controls are displayed on some separate keyboards of the at least two separate keyboards, and the displaying module 102 is further configured to:

update, in response to the function control displayed on a first separate keyboard being triggered, a content displayed on the first separate keyboard to a function content called by the function control, and keep a content displayed on other separate keyboards unchanged.

The first separate keyboard is one of said some separate keyboards, and the other separate keyboards are other separate keyboards of said some separate keyboards than the first separate keyboard.

In an embodiment, the at least two separate keyboards include a first separate keyboard and a second separate keyboard, and the determining module 101 generates the at least two separate keyboards with the display areas separated from each other on the screen of the terminal in a way of:

generating a first separate keyboard and a second separate keyboard, and determining a first display area and a second display area at bottom of the screen of the terminal, a separation area being located between the first display area and the second display area for separating the first display area and the second display area; and displaying the first separate keyboard on the first display area, and displaying the second separate keyboard on the second display area.

In an embodiment, a promotion information prompting area is displayed on some separate keyboards of the at least two separate keyboards, and the displaying module 102 is further configured to:

display, in response to obtaining promotion information sent by a cloud side, the promotion information on the promotion information prompting area.

Regarding the device in the foregoing embodiments, the specific manner in which each module performs operation has been described in detail in the embodiments of the method, and detailed description thereof will not be repeated here.

Figure 11:
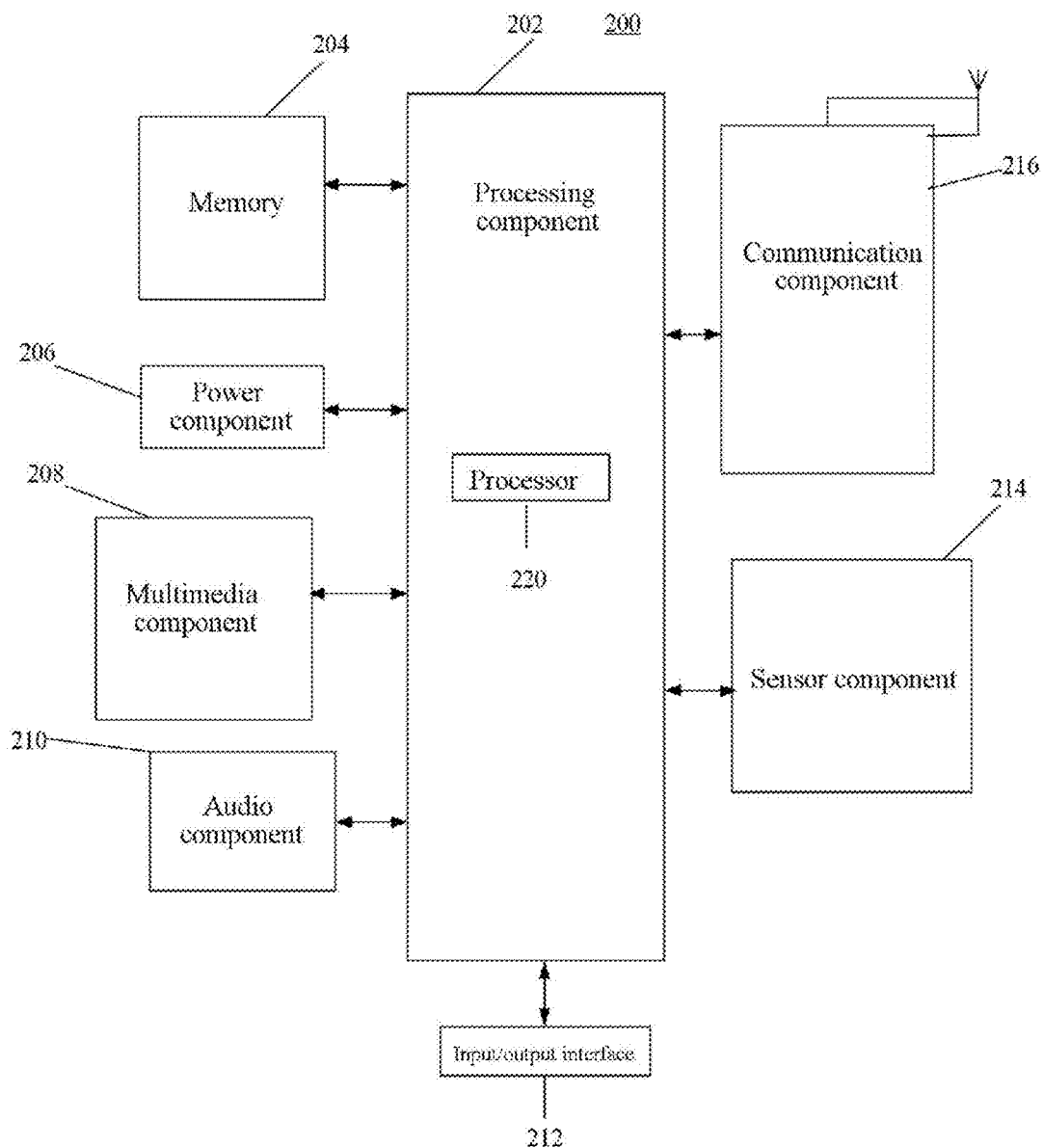
FIG. 11 shows a block diagram of a device for keyboard displaying according to an example of the present disclosure.

FIG. 11 is a block diagram showing a device 200 for keyboard displaying according to an example of the present disclosure. For example, the device 200 may be a mobile phone, a computer, a digital broadcasting terminal, a messaging device, a game console, a tablet device, a medical device, a fitness device, a personal digital assistant and the like.

Referring to FIG. 11, the device 200 may include one or more of a processing component 202, a memory 204, a power component 206, a multimedia component 208, an audio component 210, an input/output (I/O) interface 212, a sensor component 214, and a communication component 216.

The processing component 202 generally controls the overall operations of the device 200, such as operations associated with display, telephone calls, data communications, camera operations, and recording operations. The processing component 202 may include one or more processors 220 to execute instructions to complete all or part of the steps of the foregoing method. In addition, the processing component 202 may include one or more modules to facilitate interaction between the processing component 202 and other components. For example, the processing component 202 may include a multimedia module to facilitate the interaction between the multimedia component 208 and the processing component 202.

The memory 204 is configured to store various types of data to support the operation of the device 200. Examples of these data include instructions for any application or method operating on the device 200, contact data, phone book data, messages, pictures, videos and the like. The memory 204 may be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 206 provides power to various components of the device 200. The power component 206 may include a power management system, one or more power supplies, and other components associated with generating, managing, and distributing power for the device 200.

The multimedia component 208 includes a screen that provides an output interface between the device 200 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 208 includes a front camera and/or a rear camera. When the device 200 is in an operation mode, such as a shooting mode or a video mode, the front camera and/or the rear camera can receive external multimedia data. Each front camera and rear camera may be a fixed optical lens system or have focal length and optical zoom capabilities.

The audio component 210 is configured to output and/or input audio signals. For example, the audio component 210 includes a microphone (MIC), and when the device 200 is in an operation mode, such as a call mode, a recording mode, and a voice recognition mode, the microphone is configured to receive an external audio signal. The received audio signal can be further stored in the memory 204 or sent via the communication component 216. In some embodiments, the audio component 210 further includes a speaker for outputting audio signals.

The I/O interface 212 provides an interface between the processing component 202 and a peripheral interface module. The above-mentioned peripheral interface module may be a keyboard, a click wheel, a button, and the like. These buttons may include but are not limited to home button, volume button, start button, and lock button.

The sensor component 214 includes one or more sensors for providing the device 200 with various aspects of state evaluation. For example, the sensor component 214 can detect the on/off status of the device 200 and the relative positioning of components. For example, the component is a display and keypad of the device 200. The sensor component 214 can also detect the position change of the device 200 or a component of the device 200, the presence or absence of contact between the user and the device 200, the orientation or acceleration/deceleration of the device 200, and the temperature change of the device 200. The sensor component 214 may include a proximity sensor configured to detect the presence of nearby objects when there is no physical contact. The sensor component 214 may also include a light sensor, such as a CMOS or CCD image sensor, for use in imaging applications. In some embodiments, the sensor component 214 may also include an acceleration sensor, a gyroscope sensor, a magnetic sensor, a pressure sensor, or a temperature sensor.

The communication component 216 is configured to facilitate wired or wireless communication between the device 200 and other devices. The device 200 can access a wireless network based on a communication standard, such as WiFi, 2G, or 3G, or a combination thereof. In an example, the communication component 216 receives a broadcast signal or broadcast related information from an external broadcast management system via a broadcast channel. In an example, the communication component 216 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an example, the device 200 may be implemented by one or more application specific integrated circuits (ASIC), digital signal processors (DSP), digital signal processing device (DSPD), programmable logic devices (PLD), field programmable gate array (FPGA), controller, microcontroller, microprocessor, or other electronic components, used to perform the above-mentioned methods.

An example also provides a non-transitory computer-readable storage medium including instructions, such as the memory 204 including instructions, and the instructions may be executed by the processor 220 of the device 200 to complete the foregoing method. For example, the non-transitory computer-readable storage medium may be ROM, random access memory (RAM), CD-ROM, magnetic tape, floppy disk, optical data storage device and the like.

It can be understood that in the present disclosure, the term "a plurality of" refers to two or more than two, and other quantifiers have similar meanings. The term "and/or" describes relationship of associated objects, indicating that there can be three relationships, for example, A and/or B may mean: A alone exists, A and B exist at the same time, and B exists alone. The character "/" generally indicates that the associated objects before and after "/" are in an "or" relationship. A singular form such as "a", "said" and "the" are also intended to include plural forms, unless the context clearly indicates other meanings.

It can be further understood that the terms "first", "second" and the like are used to describe various information, but the information should not be limited to these terms. These terms are only used to distinguish the same type of information from each other, and do not indicate a specific order or degree of importance. In fact, the expression such as "first" and "second" can be used interchangeably. For example, without departing from the scope of the present disclosure, first information may also be referred to as second information, and similarly, second information may also be referred to first information.

It can be further understood that, unless otherwise specified, the term "connect" includes a direct connection between two objects without other components, and also includes an indirect connection between the two objects with other elements therebetween.

It can be further understood that although the operations in the embodiments of the present disclosure are described in a specific order in the drawings, they should not be understood as requiring these operations to be performed in the specific order shown or in a serial order, or requiring to perform all the operations shown to get the desired result. In certain circumstances, multitasking and parallel processing may be advantageous.

Those skilled in the art will easily conceive of other embodiments of the present disclosure after considering the specification and practicing the present disclosure disclosed herein. The present application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and the embodiments are to be regarded as exemplary only, and the true scope and spirit of the present disclosure are pointed out by the following claims.

It should be understood that the present disclosure is not limited to the precise structure that has been described above and shown in the drawings, and various modifications and changes can be made without departing from the scope thereof. The scope of the present disclosure is only limited by the appended claims.

What is claimed is:

1. A method for displaying a keyboard, comprising:
generating, by a terminal and in response to receiving a trigger for displaying separate keyboards, at least two separate keyboards with display areas separated from each other on a screen of the terminal, the at least two separate keyboards being generated respectively based on corresponding keyboard panels; and
displaying, by the terminal, keyboard keys on each of the at least two separate keyboards, the keyboard keys displayed on all the at least two separate keyboards constituting keyboard keys displayed on an unseparated keyboard;
wherein generating the at least two separate keyboards with the display areas separated from each other on the screen of the terminal comprises:
generating at least two floating separate keyboards, and displaying the at least two floating separate keyboards on the screen of the terminal, display areas of the at least two floating separate keyboards on the screen of the terminal being separated from each other;
wherein a keyboard adjusting control is displayed on some floating separate keyboards of the at least two floating separate keyboards, and the method further comprises:
synchronously performing, in response to receiving a trigger for performing a separate keyboard adjustment by the keyboard adjusting control of any one of said some floating separate keyboards, a same position change or a same size change of the separate keyboard adjustment on all the at least two floating separate keyboards;
wherein the at least two separate keyboards comprise a first separate keyboard and a second separate keyboard, and
generating the at least two separate keyboards with the display areas separated from each other on the screen of the terminal further comprises:
generating the first separate keyboard and the second separate keyboard, and determining a first display area and a second display area at bottom of the screen of the terminal, a separation area being located between the first display area and the second display area for separating the first display area and the second display area; and
displaying the first separate keyboard on the first display area, and displaying the second separate keyboard on the second display area;
wherein the separation area is configured to perform display on the screen of the terminal and operated without being affected by the first separate keyboard and the second separate keyboard, and the separation area does not move with first separate keyboard and the second separate keyboard in case that the separate keyboard adjustments of the first separate keyboard and the second separate keyboard are synchronously performed.

2. The method according to claim 1, wherein one or more function controls are displayed on at least one of the first separate keyboard and the second separate keyboard, and the method further comprises:
  updating, in response to receiving a trigger for the function control displayed on one of the first separate keyboard and the second separate keyboard, a content displayed on the one of the first separate keyboard and the second separate keyboard to a function content called by the function control, and keeping a content displayed on the other one of the first separate keyboard and the second separate keyboard unchanged.

3. The method according to claim 1, wherein a promotion information prompting area is displayed on at least one of the first separate keyboard and the second separate keyboard, and
  the method further comprises:
  displaying, in response to obtaining promotion information sent by a cloud side, the promotion information on the promotion information prompting area.

4. The method according to claim 1, wherein the same size change comprises zooming out or zooming in display sizes of all the at least two floating separate keyboards with a same zooming ratio.

5. A device for displaying a keyboard, which is applied to a terminal, comprising:
  a processor; and
  a memory having instructions stored thereon that when being executed by the processor, cause the processor to perform acts comprising:
  generating, in response to receiving a trigger for displaying separate keyboards, at least two separate keyboards with display areas separated from each other on a screen of the terminal, the at least two separate keyboards being generated respectively based on corresponding keyboard panels; and
  displaying keyboard keys on each of the at least two separate keyboards, the keyboard keys displayed on all the at least two separate keyboards constituting keyboard keys displayed on an unseparated keyboard;
  wherein generating the at least two separate keyboards with the display areas separated from each other on the screen of the terminal comprises:
  generating at least two floating separate keyboards, and displaying the at least two floating separate keyboards on the screen of the terminal, display areas of the at least two floating separate keyboards on the screen of the terminal being separated from each other;
  wherein a keyboard adjusting control is displayed on some floating separate keyboards of the at least two floating separate keyboards, and the method further comprises:
  synchronously performing, in response to receiving a trigger for performing a separate keyboard adjustment by the keyboard adjusting control of any one of said some floating separate keyboards, a same position change or a same size change of the separate keyboard adjustment on all the at least two floating separate keyboards;
  wherein the at least two separate keyboards comprise a first separate keyboard and a second separate keyboard, and
  generating the at least two separate keyboards with the display areas separated from each other on the screen of the terminal further comprises:
  generating the first separate keyboard and the second separate keyboard, and determining a first display area and a second display area at bottom of the screen of the terminal, a separation area being located between the first display area and the second display area for separating the first display area and the second display area; and
  displaying the first separate keyboard on the first display area, and displaying the second separate keyboard on the second display area;
  wherein the separation area is configured to perform display on the screen of the terminal and operated without being affected by the first separate keyboard and the second separate keyboard, and the separation area does not move with first separate keyboard and the second separate keyboard in case that the separate keyboard adjustments of the first separate keyboard and the second separate keyboard are synchronously performed.

6. The device according to claim 5, wherein one or more function controls are displayed on at least one of the first separate keyboard and the second separate keyboard, and the processor is caused to perform acts further comprising:
  updating, in response to receiving a trigger for the function control displayed on one of the first separate keyboard and the second separate keyboard, a content displayed on the one of the first separate keyboard and the second separate keyboard to a function content called by the function control, and keeping a content displayed on the other one of the first separate keyboard and the second separate keyboard unchanged.

7. The device according to claim 5, wherein a promotion information prompting area is displayed on at least one of the first separate keyboard and the second separate keyboard, and
  the processor is caused to perform acts further comprising:
  displaying, in response to obtaining promotion information sent by a cloud side, the promotion information on the promotion information prompting area.

8. The device according to claim 5, wherein the same size change comprises zooming out or zooming in display sizes of all the at least two floating separate keyboards with a same zooming ratio.

9. A non-transitory computer-readable storage medium, having instructions stored thereon that, when being executed by a processor of a terminal, cause the terminal to perform acts comprising:
  generating, in response to receiving a trigger for displaying separate keyboards, at least two separate keyboards with display areas separated from each other on a screen of the terminal, the at least two separate keyboards being generated respectively based on corresponding keyboard panels; and
  displaying keyboard keys on each of the at least two separate keyboards, the keyboard keys displayed on all the at least two separate keyboards constituting keyboard keys displayed on an unseparated keyboard;
  wherein generating the at least two separate keyboards with the display areas separated from each other on the screen of the terminal comprises:
  generating at least two floating separate keyboards, and displaying the at least two floating separate keyboards on the screen of the terminal, display areas of the at least two floating separate keyboards on the screen of the terminal being separated from each other;

wherein a keyboard adjusting control is displayed on some floating separate keyboards of the at least two floating separate keyboards, and the method further comprises:

synchronously performing, in response to receiving a trigger for performing a separate keyboard adjustment by the keyboard adjusting control of any one of said some floating separate keyboards, a same position change or a same size change of the separate keyboard adjustment on all the at least two floating separate keyboards;

wherein the at least two separate keyboards comprise a first separate keyboard and a second separate keyboard, and generating the at least two separate keyboards with the display areas separated from each other on the screen of the terminal further comprises:

generating the first separate keyboard and the second separate keyboard, and determining a first display area and a second display area at bottom of the screen of the terminal, a separation area being located between the first display area and the second display area for separating the first display area and the second display area; and displaying the first separate keyboard on the first display area, and displaying the second separate keyboard on the second display area;

wherein the separation area is configured to perform display on the screen of the terminal and operated without being affected by the first separate keyboard and the second separate keyboard, and the separation area does not move with first separate keyboard and the second separate keyboard in case that the separate keyboard adjustments of the first separate keyboard and the second separate keyboard are synchronously performed.

10. The non-transitory computer-readable storage medium according to claim 9, wherein one or more function controls are displayed on at least one of the first separate keyboard and the second separate keyboard, and the terminal is caused to perform acts further comprising:

updating, in response to receiving a trigger for the function control displayed on one of the first separate keyboard and the second separate keyboard, a content displayed on the one of the first separate keyboard and the second separate keyboard to a function content called by the function control, and keeping a content displayed on the other one of the first separate keyboard and the second separate keyboard unchanged.

11. The non-transitory computer-readable storage medium according to claim 9, wherein a promotion information prompting area is displayed on at least one of the first separate keyboard and the second separate keyboard, and the terminal is caused to perform acts further comprising:

displaying, in response to obtaining promotion information sent by a cloud side, the promotion information on the promotion information prompting area.

12. The non-transitory computer-readable storage medium according to claim 9, wherein the same size change comprises zooming out or zooming in display sizes of all the at least two floating separate keyboards with a same zooming ratio.

* * * * *